United States Patent
Lee

(10) Patent No.: US 11,266,872 B2
(45) Date of Patent: Mar. 8, 2022

(54) VIRTUAL ROAD SURFACE IMPLEMENTATION-TYPE BICYCLE SIMULATOR

(71) Applicants: REAL DESIGN TECH CO., LTD., Seoul (KR); Joong Sik Lee, Gyeonggi-do (KR)

(72) Inventor: Joong Sik Lee, Gyeonggi-do (KR)

(73) Assignees: REAL DESIGN TECH CO., LTD., Seoul (KR); Joong Sik Lee, Gyeonggi-Do (KR)

( * ) Notice: Subject to any disclaimer, the term of this patent is extended or adjusted under 35 U.S.C. 154(b) by 119 days.

(21) Appl. No.: 16/633,520

(22) PCT Filed: Feb. 28, 2018

(86) PCT No.: PCT/KR2018/002474
§ 371 (c)(1),
(2) Date: Jan. 23, 2020

(87) PCT Pub. No.: WO2019/022331
PCT Pub. Date: Jan. 31, 2019

(65) Prior Publication Data
US 2020/0230461 A1    Jul. 23, 2020

(30) Foreign Application Priority Data

Jul. 27, 2017  (KR) .................. 10-2017-0095473

(51) Int. Cl.
*A63B 22/06* (2006.01)
*A63F 13/212* (2014.01)
(Continued)

(52) U.S. Cl.
CPC ...... *A63B 22/0605* (2013.01); *A63B 24/0087* (2013.01); *A63B 69/16* (2013.01);
(Continued)

(58) Field of Classification Search
CPC .............. A63B 22/0605–2022/0658; A63B 69/16–2069/168; A63B 24/0087; A63B 2220/78
See application file for complete search history.

(56) References Cited

U.S. PATENT DOCUMENTS

| 4,958,832 A | * | 9/1990 | Kim | ................ | A63B 22/16 482/54 |
| 6,857,992 B1 | * | 2/2005 | Kolda | ................ | A63B 21/0051 482/61 |
| 2008/0220947 A1 | | 9/2008 | Meng | | |

FOREIGN PATENT DOCUMENTS

| CN | 2411031 | 12/2000 |
| CN | 1579867 | 2/2005 |

(Continued)

OTHER PUBLICATIONS

Machine Translation of KR20150117460A (Year: 2021).*
(Continued)

*Primary Examiner* — Jennifer Robertson
(74) *Attorney, Agent, or Firm* — Burris Law, PLLC

(57) ABSTRACT

Provided is a virtual road surface implementation-type bicycle simulator. The virtual road surface implementation-type bicycle simulator according to the present disclosure includes a rear wheel support portion that supports a rear wheel of a mounted bicycle and rotates together with rotation of the rear wheel; and a road surface implementation portion including a plurality of uneven portions that perform a protrusion operation at various heights on an outer peripheral surface of the rear wheel support portion in contact with the rear wheel, thereby providing a rider riding the bicycle with various road surface states which are virtually set.

11 Claims, 12 Drawing Sheets

(51) Int. Cl.
*A63B 69/16* (2006.01)
*A63B 24/00* (2006.01)
*A63B 71/06* (2006.01)

(52) U.S. Cl.
CPC .... *A63F 13/212* (2014.09); *A63B 2022/0641* (2013.01); *A63B 2024/009* (2013.01); *A63B 2069/163* (2013.01); *A63B 2069/164* (2013.01); *A63B 2071/0644* (2013.01)

(56) References Cited

FOREIGN PATENT DOCUMENTS

| | | |
|---|---|---|
| CN | 106730614 | 5/2017 |
| CN | 106861181 | 6/2017 |
| KR | 10-1119524 B1 | 2/2012 |
| KR | 10-1196473 B1 | 11/2012 |
| KR | 10-1461817 B1 | 11/2014 |
| KR | 20150117460 A * | 10/2015 |
| KR | 10-1566613 B1 | 11/2015 |
| KR | 10-1677713 B1 | 11/2016 |

OTHER PUBLICATIONS

International Search Report and Written Opinion for Application No. PCT/KR2018/002474 dated Jun. 8, 2018, 10 pages.
Office Action issued in corresponding JP Application 2020527714, dated Mar. 8, 2021.
European Search Report issued in corresponding EP Application No. 18838995, dated Apr. 9, 2021.
Office Action issued in corresponding CN Application 2018800499567 dated Nov. 13, 2020.

* cited by examiner

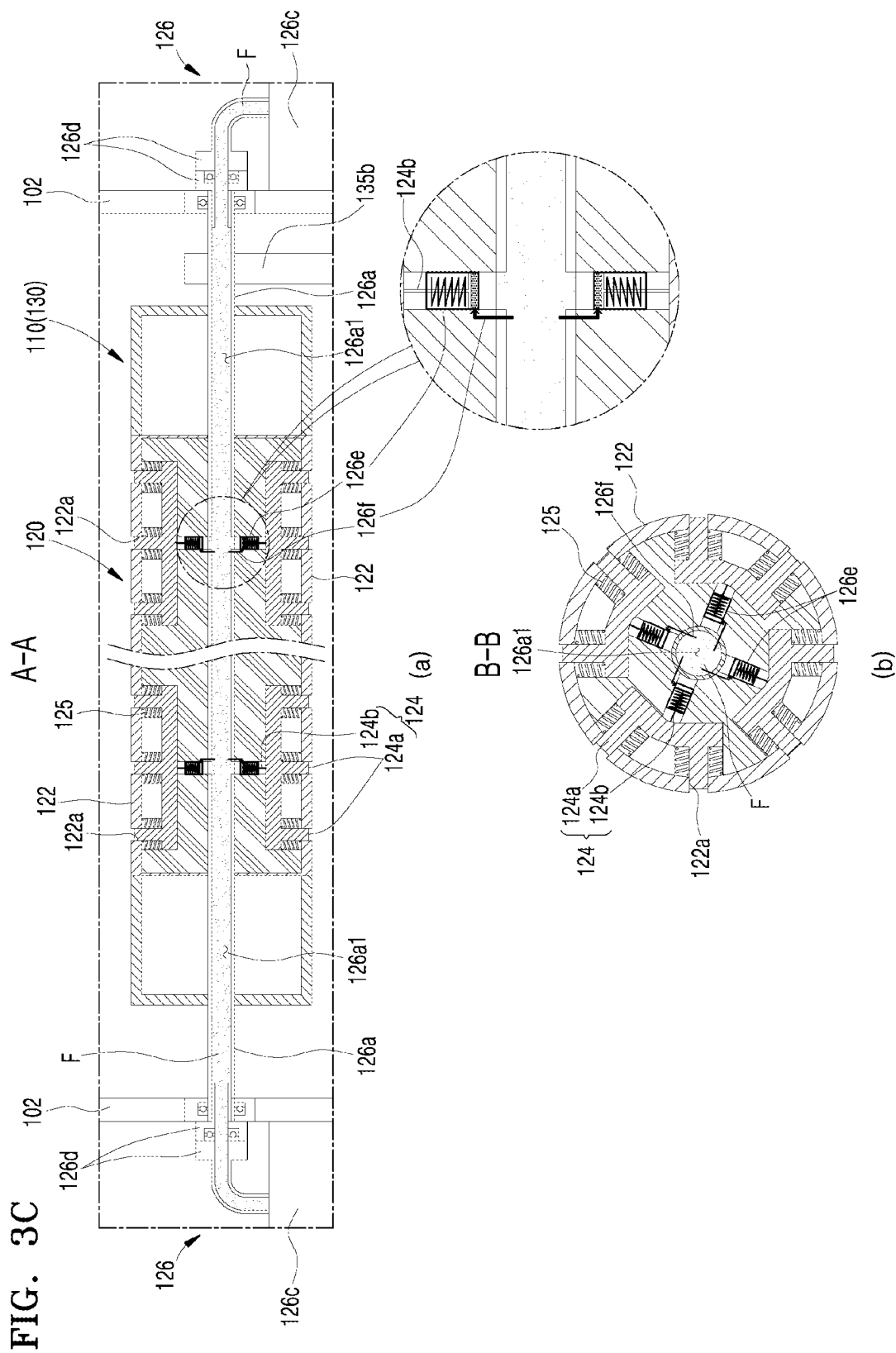

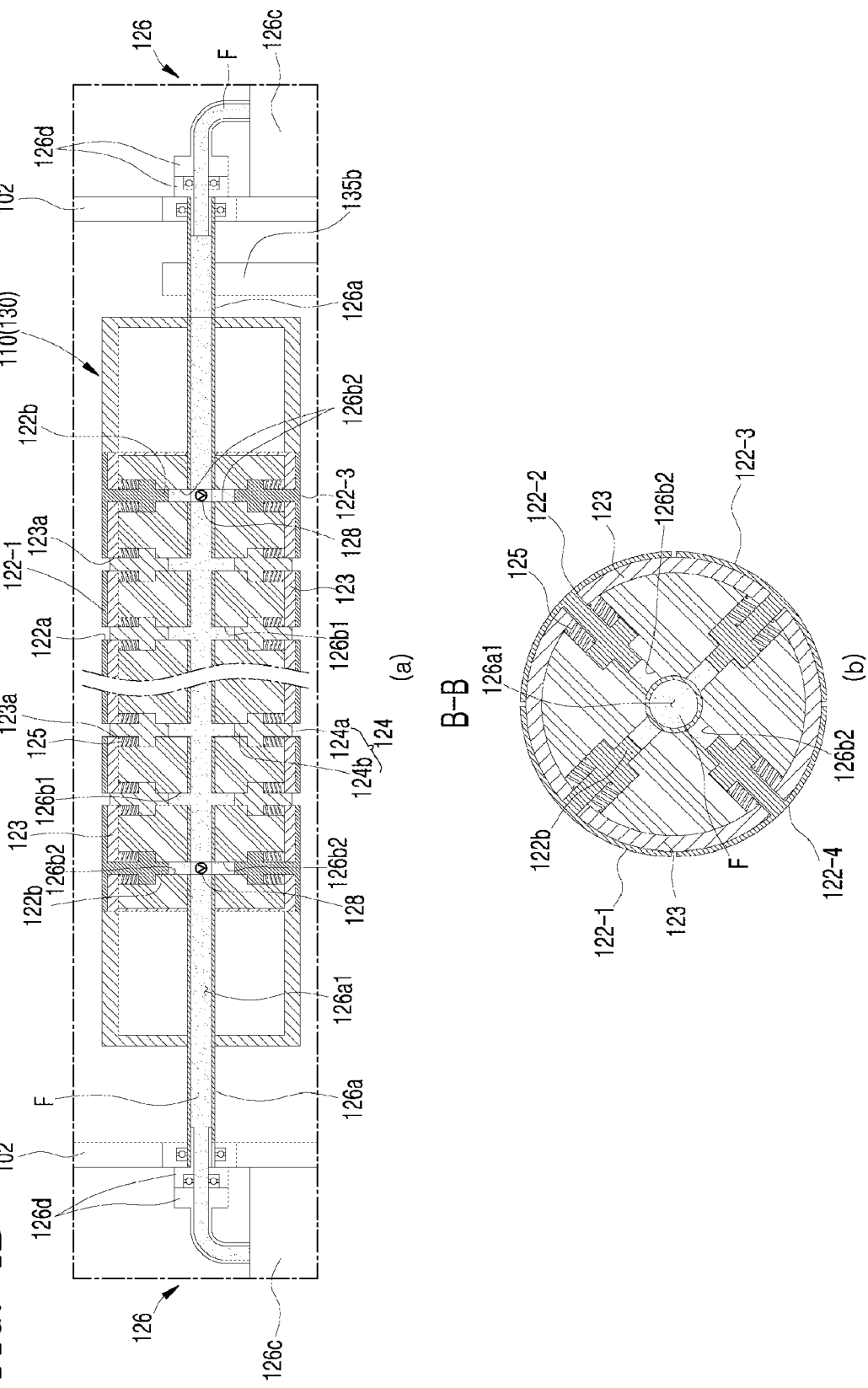

(a)

(b)

(a)

(b)

(a)

(b)

VIRTUAL ROAD SURFACE IMPLEMENTATION-TYPE BICYCLE SIMULATOR

RELATED APPLICATION(S)

The present application is a national stage application under 35 U.S.C. § 371 of International Application No. PCT/KR2018/002474, filed Feb. 28, 2018, and which claims priority from Korean Application No. 10-2017-0095473, filed Jul. 27, 2017. The above-referenced applications are hereby incorporated by reference into the present application in their entirety.

TECHNICAL FIELD

The present disclosure relates to a virtual road surface implementation-type bicycle simulator, and more particularly, to a bicycle simulator which allows various road surfaces such as a general paved road, an unpaved forest road, and a mountain road to be virtually experienced in an indoor space and allowing exercise effects to be enjoyed.

BACKGROUND ART

In general, bicycle exercise equipment called bicycle trainers or bicycle rollers are, along with treadmills, the most widely used fitness equipment for indoor exercise, wherein a rider riding a bicycle seated on a rotation roller or a cradle uses a pedal to rotate a wheel with a rotational resistance force (magnetic force or the like), to thereby enhance lower body muscle strength.

Such conventional bicycle exercise equipment has an advantage in that a rider may be provided with a very high amount of exercise with only a relatively short period of exercise through adjustment of the rotational resistance force applied to the wheel regardless of weather.

However, since conventional bicycle exercise equipment only sustains pedaling exercise with rotational resistance force while facing a wall or the like in a closed indoor space, there has been problems in that continuous pedaling exercise is hard to continue due to boredom or weariness of not providing the rider with pleasure of riding a bicycle.

In order to solve the above problems, Korean Patent Registration No. 10-1677713 (publication date: Nov. 23, 2016) discloses a technique relating to cycle exercise equipment.

The present prior art has an advantage in which, by replacing three or more roller portions which rotate about a fixed shaft (central shaft) and have outer wall shapes different from each other, a rider may be provided with a riding experience on various road surface states similar to when actually riding a bicycle, and excitement due to this allows the rider to maintain continuous pedaling exercise.

However, the cycle exercise equipment proposed in the prior art still needs to be improved in the following points and needs to be steadily improved.

For example, by rotating the three or more roller portions themselves back and forth and implementing various road surfaces, a structure thereof is complicated and manufacturing or maintenance difficulties are expected, and if the roller portions rotate to change the road surfaces, the bicycle itself being pedaled largely moves up and down, and thus, there is a problem in that, while safety of the rider riding the bicycle is seriously impaired, a natural change in the road surface is not implemented.

In addition, in a case where a rear wheel rotates through pedaling of a rider, an excessive pedaling load is applied to the rider due to a structure in which three or more roller portions and the fixed shaft (central shaft) all rotate together, and thus, there is a problem in that it is difficult to implement a dynamic pedaling exercise.

DESCRIPTION OF EMBODIMENTS

Technical Problem

An object of the present disclosure is to provide a virtual road surface implementation-type bicycle simulator that simplifies a structure and the number of components by implementing, with one roller instead of many rollers, various road surface states to be felt during riding, enables a natural change in the road surface without any discomfort and ensures safety of a rider on board, and enables a dynamic experience that is very similar to real riding situations.

Solution to Problem

The object is achieved by a virtual road surface implementation-type bicycle simulator which includes a rear wheel support portion that supports a rear wheel of a mounted bicycle and rotates together with rotation of the rear wheel; and a road surface implementation portion including a plurality of uneven portions that perform a protrusion operation at various heights on an outer peripheral surface of the rear wheel support portion in contact with the rear wheel, and provides a rider riding the bicycle with various road surface states which are virtually set.

The rear wheel support portion may comprise a first rear roller and a second rear roller which support back and forth at a lower side of the rear wheel, and each of the first rear roller and the second rear roller may be provided with the road surface implementation portion including the uneven portions having the same shape or sizes different from each other.

The virtual road surface implementation-type bicycle simulator may further comprises a front wheel support portion that supports a front wheel of the mounted bicycle and rotates together with rotation of the rear wheel support portion, and the front wheel support portion may be provided with the road surface implementation portion including the plurality of uneven portions that are in contact with the front wheel and perform a protrusion operation at various heights.

The road surface implementation portion may comprise an outer frame which forms an outer edge and in which a plurality of surface holes are formed; the plurality of uneven portions that reciprocate inside the outer frame such that protrusions provided at one end portion thereof perform the protrusion operation through the surface holes; and a drive unit that variably provide pressure of fluid to the other end portion of the uneven portion to reciprocate the uneven portions.

The drive unit may comprise a hollow-shaped shaft forming a rotation axis of the rear wheel support portion, a branch cylinder respectively communicating between the other end portions of the uneven portions and the shaft, and a pump for variably providing the fluid to the shaft through a rotary joint.

The road surface implementation portion may comprise an outer frame forming an outer edge, having a plurality of surface holes formed therein, and including two or more split frames which perform a protrusion operation; an inner frame in which a plurality of through-holes corresponding to the surface holes are formed; the plurality of uneven portions that reciprocate inside the inner frame such that protrusions provided at one end portion thereof perform a protrusion operation through the surface holes and the through-holes; and a drive unit that reciprocates at least one of the uneven portions and the outer frame by variably providing pressure of fluid to the uneven portions and the other end portion of the outer frame.

The drive unit may comprise a hollow-shaped shaft forming a rotation axis of the rear wheel support portion, a first branch cylinder that respectively communicates between the other end portions of the uneven portions and the shaft, a second branch cylinder that communicates between the other end portion of the outer frame and the shaft, a pump that variably provides the fluid to the shaft through a rotary joint, and a direction control valve that is provided at at least one side of the first branch cylinder and the second branch cylinder to selectively control flow of the fluid.

The virtual road surface implementation-type bicycle simulator may further comprise a power transmission unit that transmits a rotational force of the rear wheel support portion to the front wheel support portion to rotate the front wheel.

The virtual road surface implementation-type bicycle simulator may further comprise a bicycle fixing portion that is detachably coupled to one side of the bicycle to fix a position of the bicycle, slides left and right, and guides left and right movements of the bicycle.

The virtual road surface implementation-type bicycle simulator may further comprise a speed measurement unit that calculates a travel speed from rotation of the rear wheel, and a blowing device that provides a variable wind to the rider according to the travel speed calculated by the speed measurement unit.

The virtual road surface implementation-type bicycle simulator may further comprise a display device that visually provides the rider with a predetermined travel environment, and a control unit that controls operations of the uneven portions according to the travel environment provided in real time through the display device.

The virtual road surface implementation-type bicycle simulator may further comprise a power storage device that generates electricity in conjunction with rotation of the rear wheel support portion and stores the electricity, and a plurality of actuators that tilts the bicycle in all directions according to a slope of the travel environment provided in real time through the display device.

Advantageous Effects of Disclosure

According to the present disclosure, a road surface implementation portion having a plurality of uneven portions varying in various heights and performing a protrusion operation is provided on an outer peripheral surface of a rear wheel support portion in contact with a rear wheel, and thereby, a rider riding a bicycle may virtually experience states of various road surfaces such as a general paved road, an unpaved road, and a mountain road by receiving various impact characteristics from the rear wheel, which allows to enjoy dynamic and realistic riding.

In addition, since a modular road surface implementation portion provided in the rear wheel support portion (and a front wheel support portion) simplifies a structure of the bicycle simulator itself, thereby, facilitating manufacture and maintenance and enabling a natural change in a road surface state without any special impact, and thus, safety of the rider may be ensured and maximization of an exercise effect may be naturally achieved through promotion of interest or fun of the rider.

Furthermore, in a case where the front wheel support portion, a power transmission unit, a control unit, a bicycle fixing portion, a speed measurement unit, a blowing device, a display device, a power storage device, and a plurality of actuators are organically coupled to be controlled and operate, the rider may be provided with more realistic, interesting, and virtual riding environments.

BRIEF DESCRIPTION OF DRAWINGS

FIG. 3C illustrates cross-sectional views, taken along lines A-A and B-B of FIG. 3A, of the internal structures of the rear wheel support portion and the road surface implementation portion, respectively, as another example;

FIG. 4B illustrates cross-sectional views, taken along lines A-A and B-B of FIG. 4A, of internal structures of the rear wheel support portion and the road surface implementation portion, respectively, as an example;

EXPLANATION OF REFERENCE NUMERALS DESIGNATING THE MAJOR ELEMENTS OF THE DRAWINGS

Figure 1:
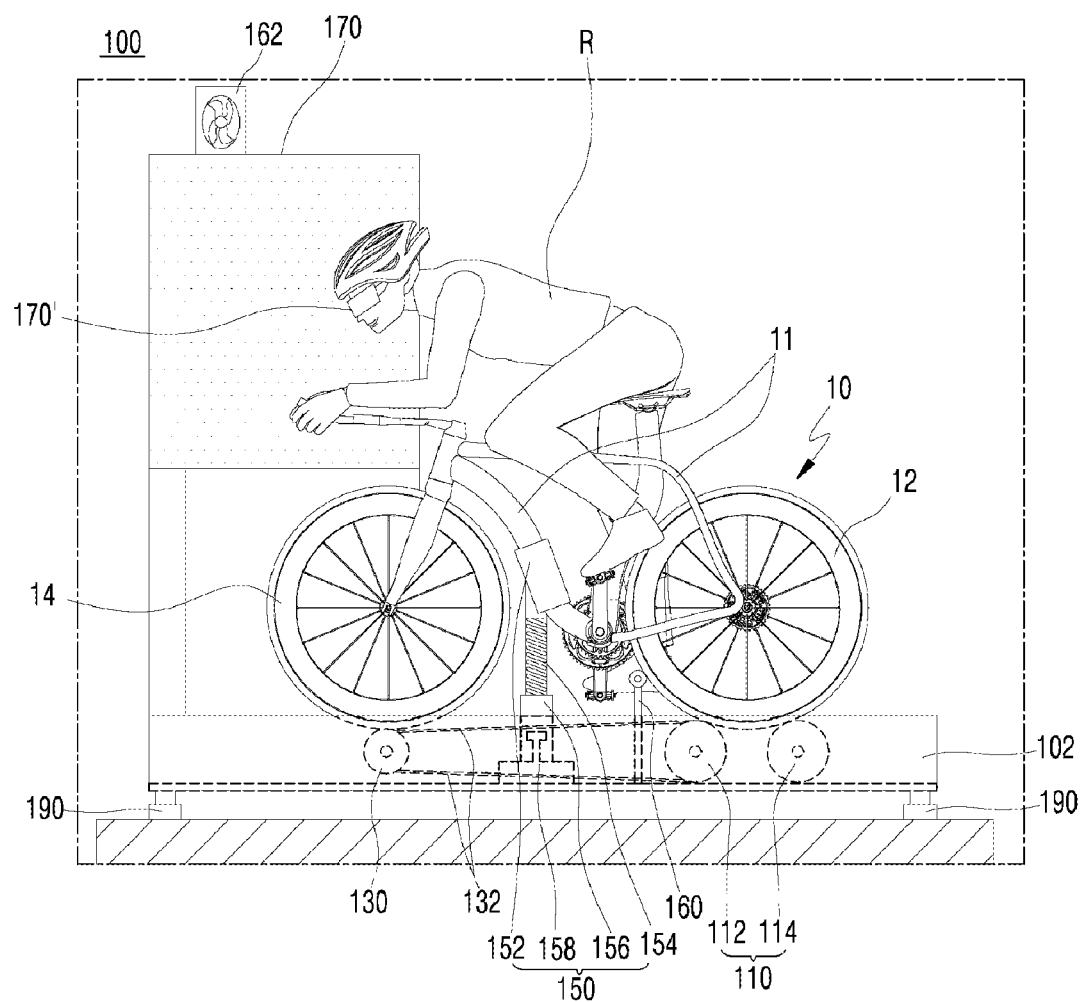
FIG. 1 is a front view of a virtual road surface implementation-type bicycle simulator according to the present disclosure.

R: Rider F: Fluid
10: Bicycle 11: Bicycle frame
12: Rear wheel 14: Front wheel
100: Virtual road implementation-type bicycle simulator
102: Base frame 110: Rear wheel support portion
112: First rear roller 114: Second rear roller
120: Road surface implementation portion 122: Outer frame
122-1 to 122-4: Split frame 122a: Surface hole
122b: Other end portion (piston) of outer frame 123: Inner frame 123a: Through-hole 124: Uneven portion
124a: Protrusion 124b: Other end portion of uneven portion (piston)
125: Elastic body 126: Drive unit
126a: Shaft 126a1: Hollow
126b: Branch cylinder 126b1: First branch cylinder
126b2: Second branch cylinder 126c: Pump
126d: Rotary joint 126e: Hydraulic cylinder
126f: Hydraulic line 128: Direction change valve
130: Front wheel support portion 132: Power transmission unit
135: Brake device 135a: Brake foot plate
135b: Caliper 140: Control unit
142: Memory 150: Bicycle fixing portion
152: Clamp 154: Coil spring
156: Guide body 158: Sliding rail
160: Speed measurement unit 162: Blowing device
170: Display device 180: Power storage device
190: Actuator

BEST MODE

Hereinafter, preferred embodiments of the present disclosure will be described in detail with reference to the accompanying drawings. However, in describing the present disclosure, descriptions on previously known functions or configurations will be omitted to clarify the gist of the present disclosure.

Figure 2:
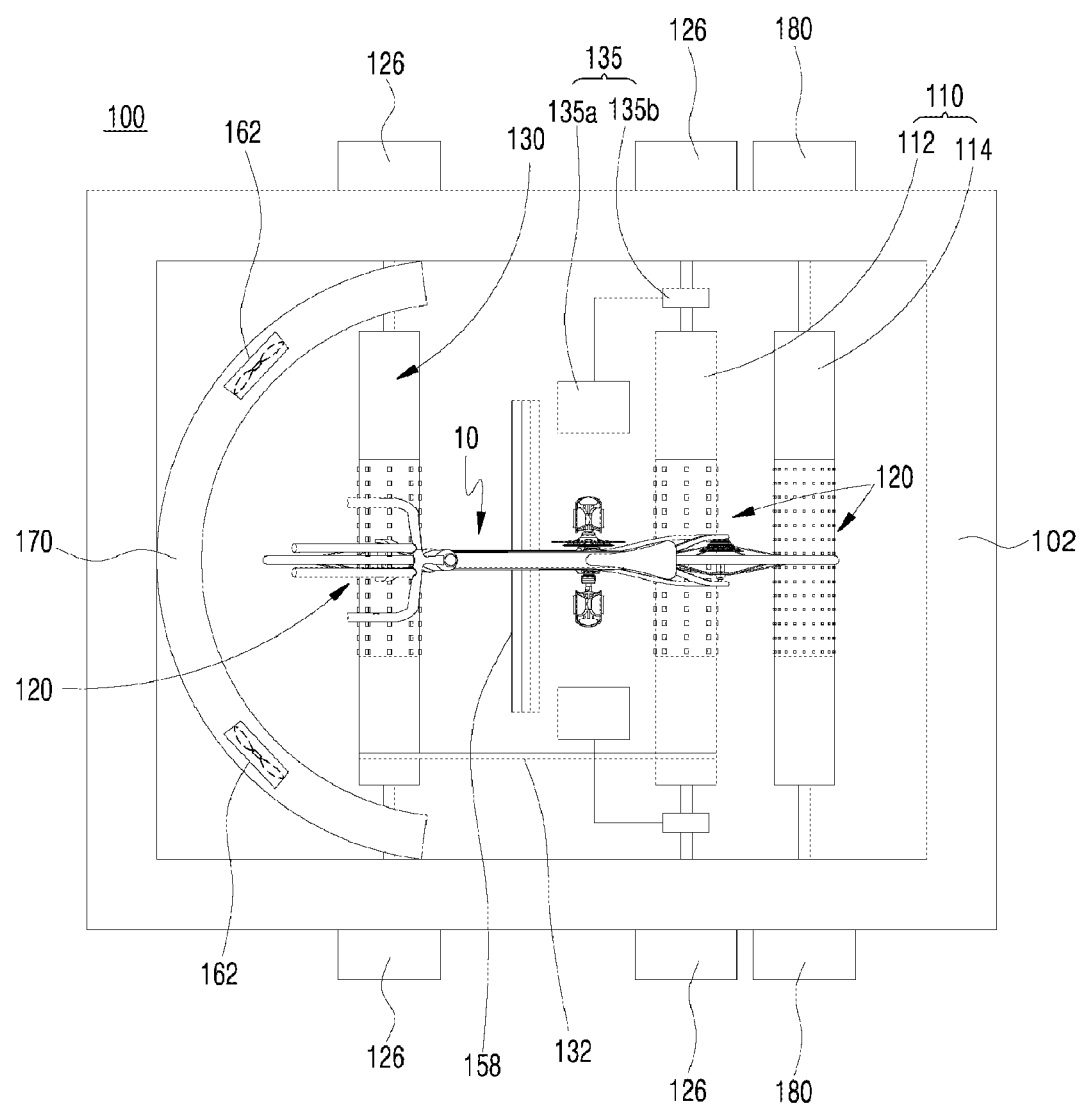
FIG. 2 is a plan view of FIG. 1.
Figure 3A:
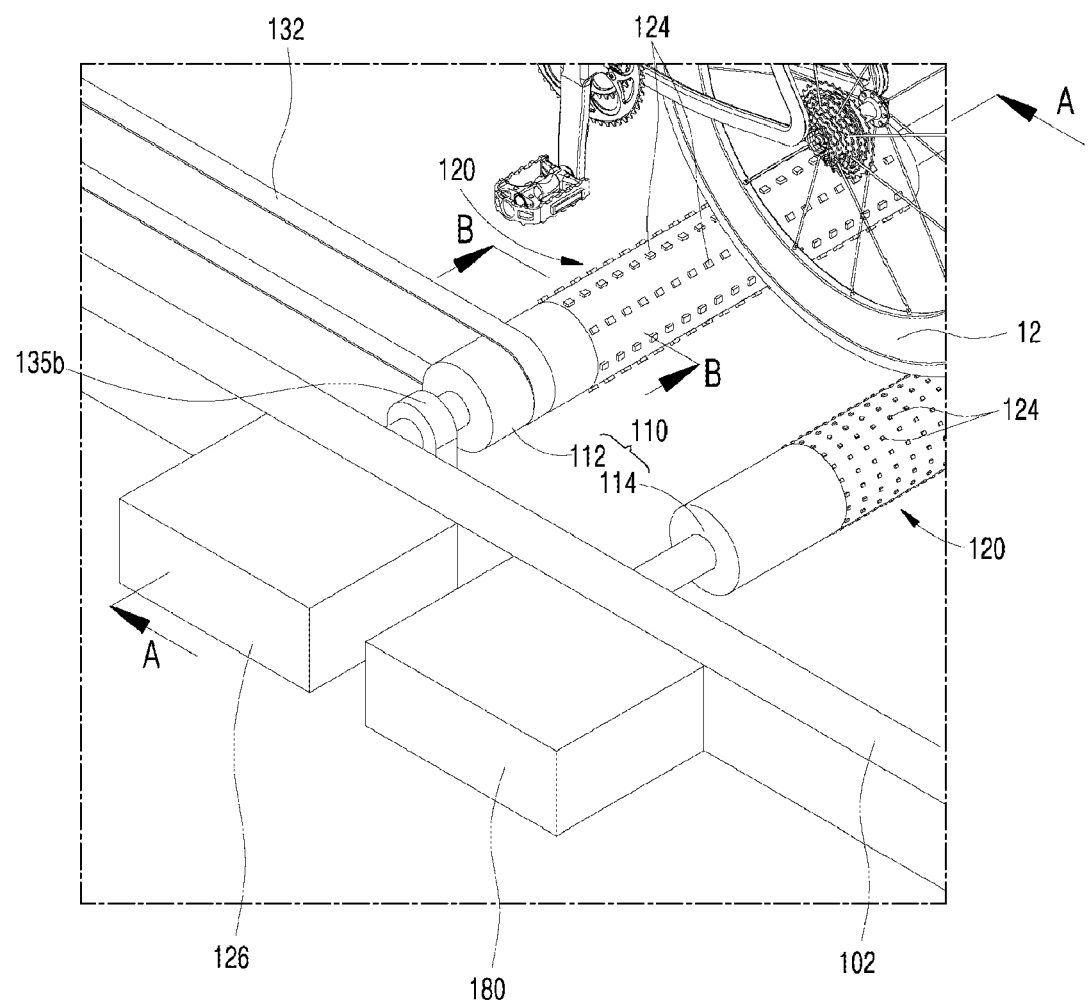
FIG. 3A is a perspective view illustrating a rear wheel support portion according to the present disclosure and a road surface implementation portion according to a first embodiment.
Figure 3B:
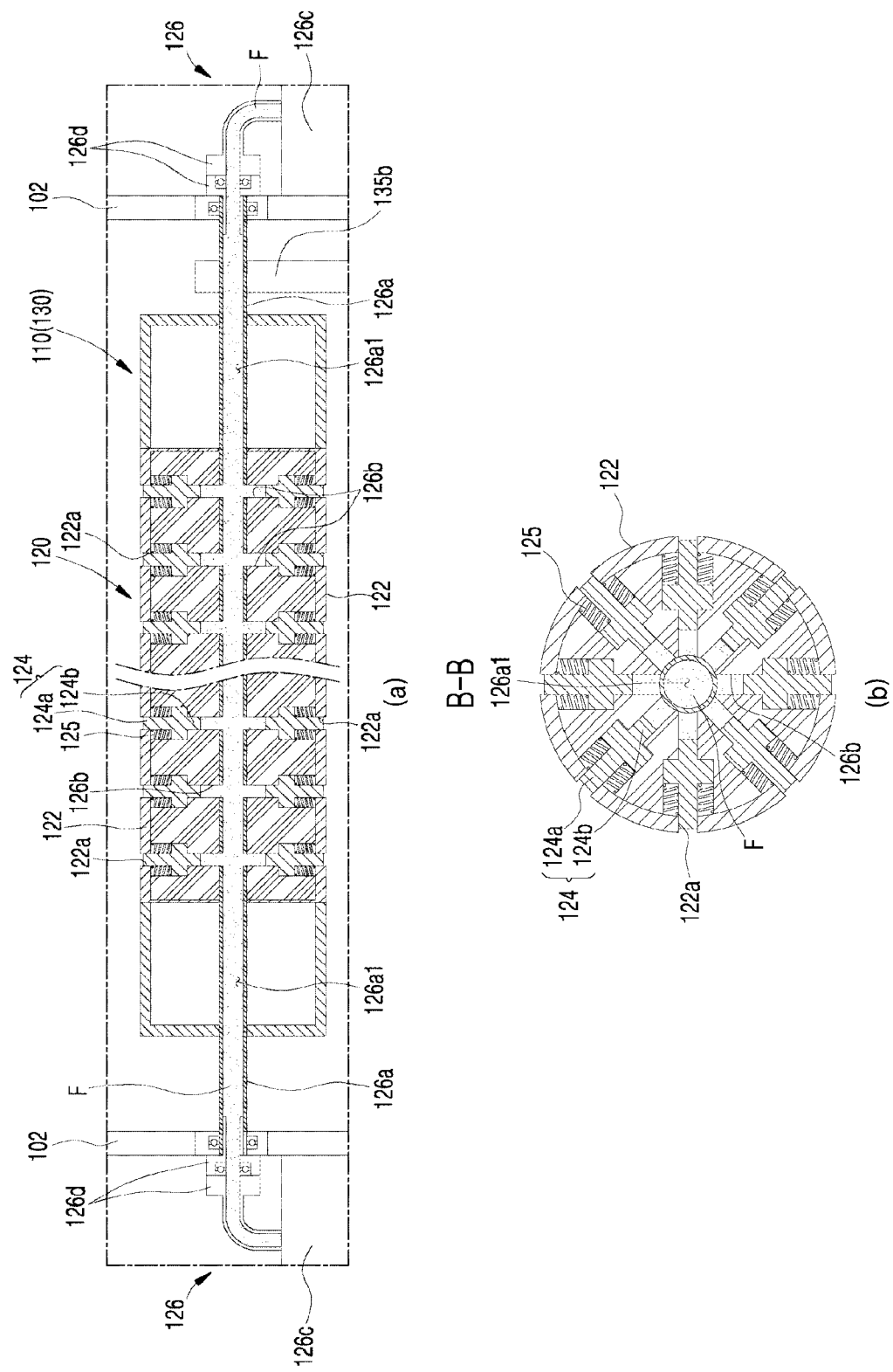
FIG. 3B illustrates cross-sectional views, taken along lines A-A and B-B of FIG. 3A, of internal structures of the rear wheel support portion and the road surface implementation portion, respectively, as an example.
Figure 4A:
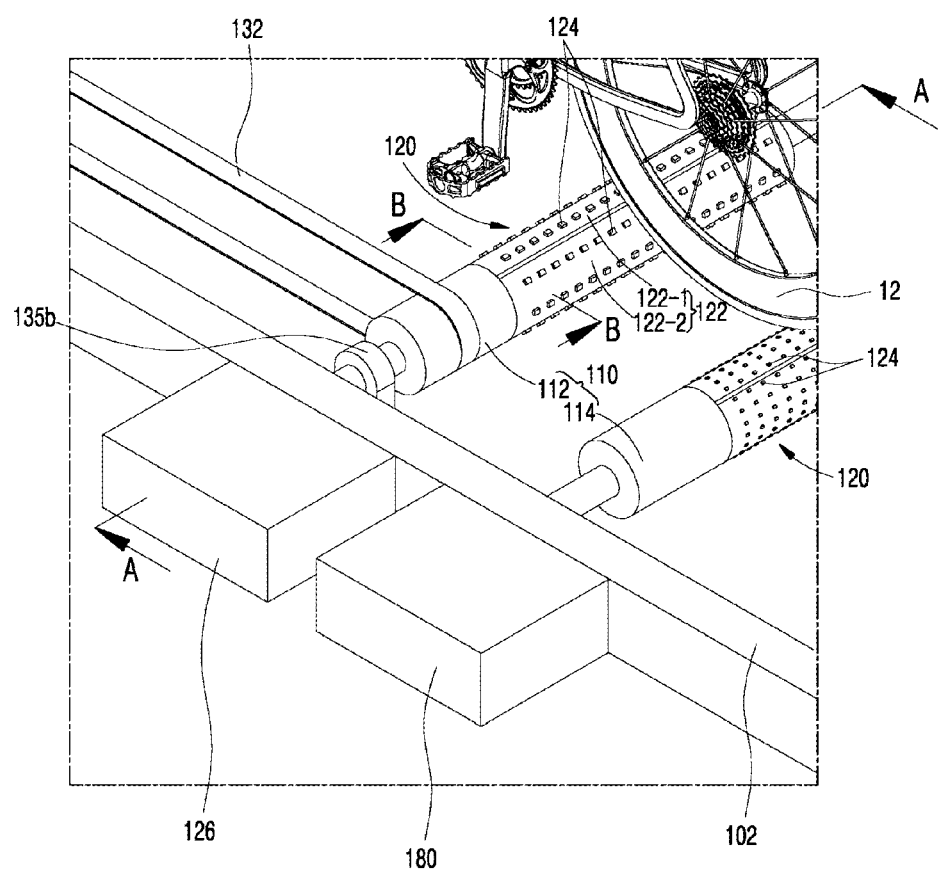
FIG. 4A is a perspective view illustrating the rear wheel support portion according to the present disclosure and a road surface implementation portion according to a second embodiment.
Figure 4C:
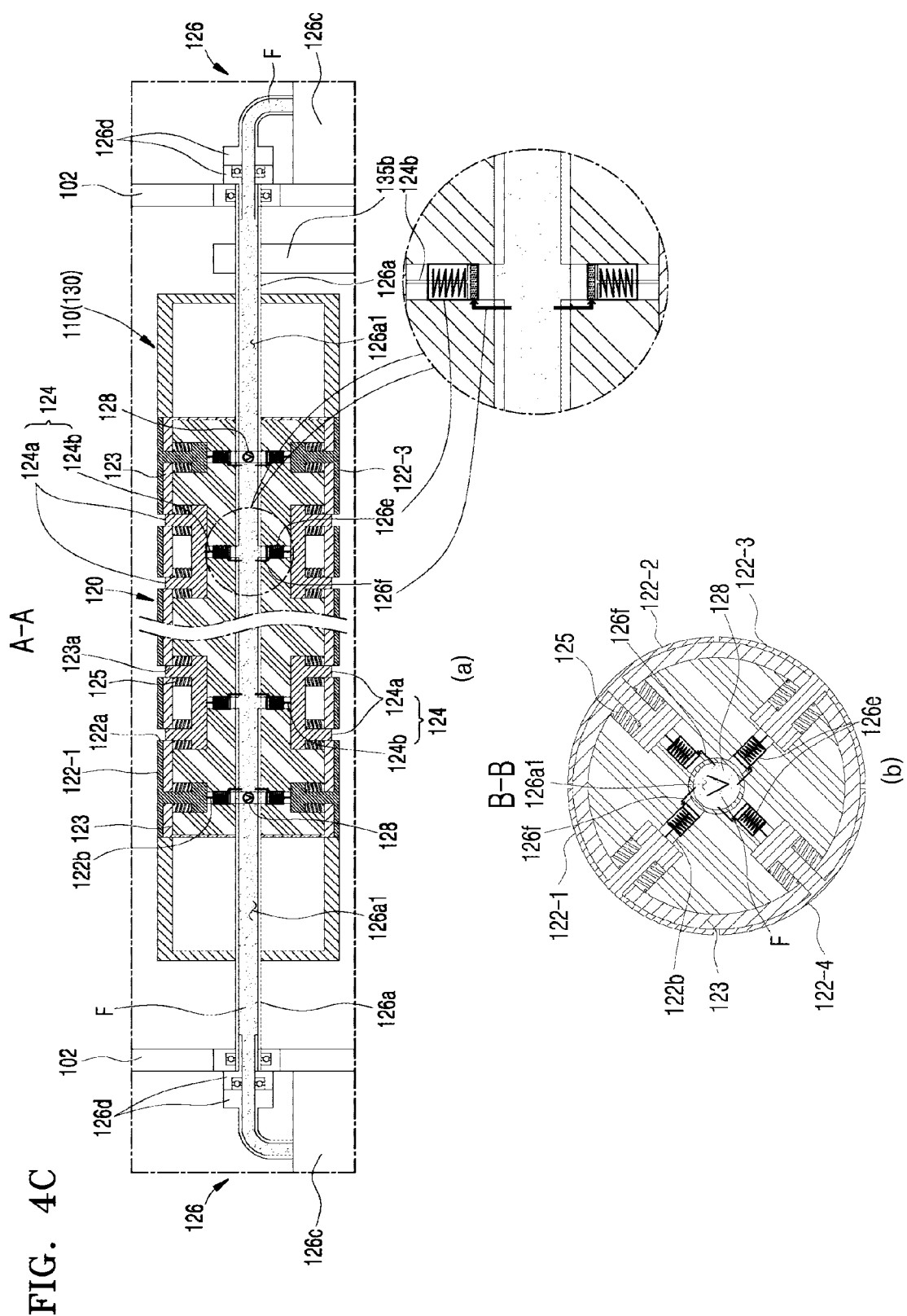
FIG. 4C illustrates cross-sectional views, taken along lines A-A and B-B of FIG. 4A, of the internal structures of the rear wheel support portion and the road surface implementation portion, respectively, as another example.
Figure 5A:
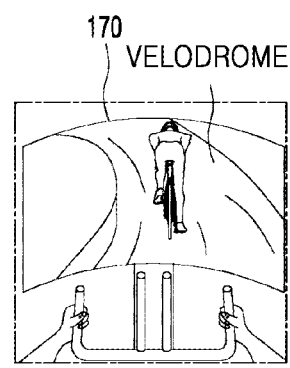
FIGS. 5A to 5C are operation state diagrams illustrating a state of the road surface implementation portion working in conjunction with a display device divided according to a paved road, a forest road, and cobblestones, respectively.
Figure 5A:
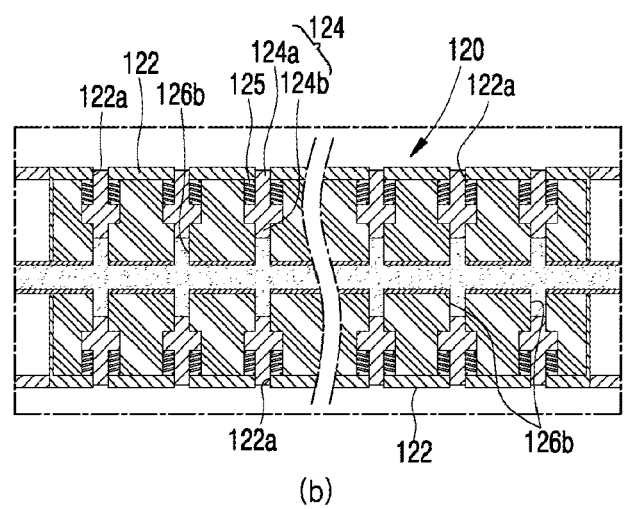
Figure 5B:
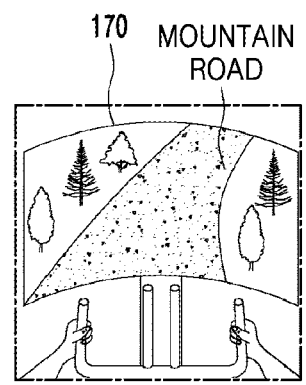
Figure 5B:
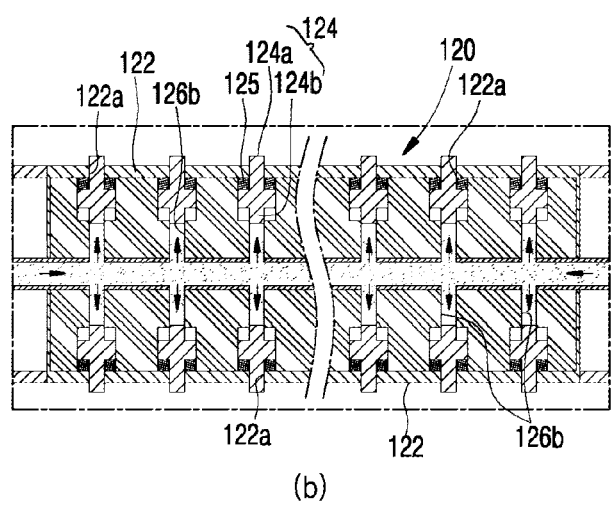
Figure 5C:
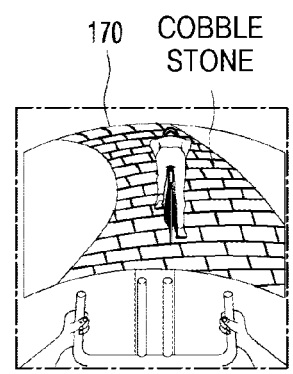
Figure 5C:
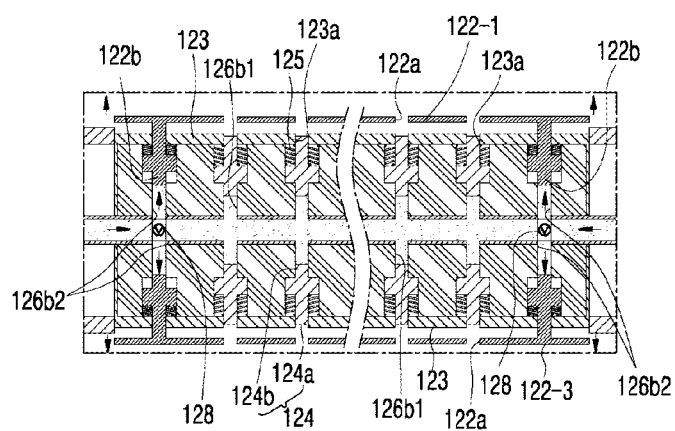
Figure 6:
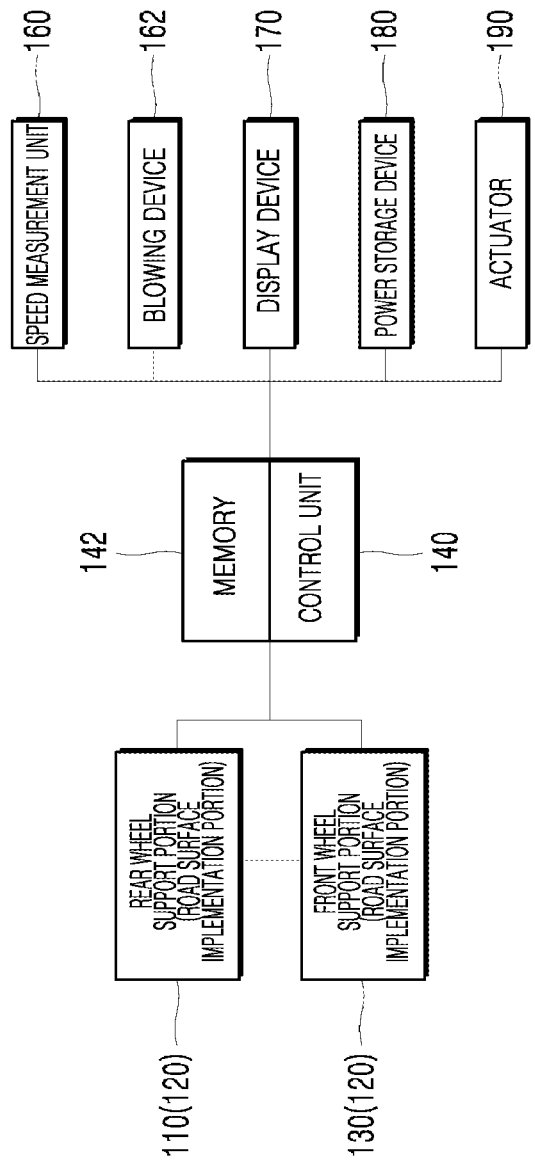
FIG. 6 is a block diagram schematically illustrating an overall configuration of the virtual road implementation-type bicycle simulator according to the present disclosure.

FIG. 1 is a front view of a virtual road surface implementation-type bicycle simulator according to the present disclosure, FIG. 2 is a plan view of FIG. 1, FIG. 3A is a perspective view illustrating a rear wheel support portion according to the present disclosure and a road surface implementation portion according to a first embodiment, FIG. 3B illustrates cross-sectional views, which are taken along cut lines A-A and B-B of FIG. 3A, of internal structures of the rear wheel support portion and the road surface implementation portion, respectively, as an example, FIG. 3C illustrates cross-sectional views, which are taken along the cut lines A-A and B-B of FIG. 3A, of the internal structures of the rear wheel support portion and the road surface implementation portion, respectively, as another example, FIG. 4A is a perspective view illustrating the rear wheel support portion according to the present disclosure and a road surface implementation portion according to a second embodiment, FIG. 4B illustrates cross-sectional views, which are taken along cut lines A-A and B-B of FIG. 4A, of internal structures of the rear wheel support portion and the road surface implementation portion, respectively, as an example, FIG. 4C illustrates cross-sectional views, which are taken along the cut lines A-A and B-B of FIG. 4A, of the internal structures of the rear wheel support portion and the road surface implementation portion, respectively, as another example, FIGS. 5A to 5C are operation state diagrams illustrating a state of the road surface implementation portion working in conjunction with a display device by dividing into a paved road, a forest road, and cobblestones, respectively, and FIG. 6 is a block diagram schematically illustrating an overall configuration of the virtual road implementation-type bicycle simulator according to the present disclosure.

Top (upper side), bottom (lower side), left and right (side), front (forward, front side), rear (back, rear side), and the like, which refer to directions in the description of the disclosure, the claims, and so on, are not intended to limit rights and are set according to a relative position between the drawings and the configuration for the sake of convenient description, and each direction which will be made below is based on this, except a case specifically limited on the contrary to this.

A virtual road surface implementation-type bicycle simulator 100 according to the present disclosure is a disclosure in which a rider R riding on a bicycle 10 receives various impact characteristics from a rear wheel 12 of the bicycle 10 to experience virtually and realistically various road surface states such as a general paved road, an unpaved forest road, and a mountain road, resulting in naturally aiming to boost a rider's interest and maximizing exercise effects, and implementation of this function may be simplified to a minimized structure to ensure ease of manufacture and maintenance and safety of the rider R at the same time.

The above-described bicycle 10 is not only specially manufactured only for the virtual road surface implementation-type bicycle simulator 100 according to the present disclosure, but also has a concept of encompassing all of the bicycles 10 manufactured and marketed by a variety of manufacturing companies. The bicycle 10 includes a bicycle frame 11 configuring a body of the bicycle 10, a front wheel 14 and a rear wheel 12 which are rotatably mounted in the bicycle frame 11, and a drive system (including crank, chain, transmission, and so on) for converting pedaling of the rider R into a rotational force of the rear wheel 12.

The virtual road surface implementation-type bicycle simulator 100 according to the present disclosure may be configured to include a rear wheel support portion 110 and a road surface implement portion 120 to implement the functions and actions described above.

Hereinafter, each configuration described above will be described in detail.

The rear wheel support portion 110 is a configuration element of a rod shape that supports the rear wheel 12 of the bicycle 10 mounted on the bicycle simulator 100 and rotates together with rotation of the rear wheel 12, and both end portions of the rear wheel support portion 110 are axially coupled to a base frame 102 of the bicycle simulator 100 to freely rotate forward or backward based on the bicycle 10 mounted on the virtual road surface implementation-type bicycle simulator 100.

The rear wheel support portion 110 may have any shape as long as the rear wheel support portion 110 may rotate together with the rear wheel 12 at the time of the rotating of the rear wheel in a state of being in contact with the rear wheel 12, and a longitudinal cross section thereof may have a polygonal shape, an elliptical shape, or a circular shape. In addition, the front wheel 14 of the bicycle 10 supports the rear wheel 12 in a state where the front wheel 14 of the bicycle 10 is firmly fixed to one side of the base frame 102 of the bicycle simulator 100, and may be configured by one rear wheel support portion 110 unlike the figure.

However, the rear wheel support portion 110 according to the present disclosure is manufactured to have a circular longitudinal cross section such that a smooth rotation according to rotation of the rear wheel 12 is achieved without providing a heterogeneous driving feeling to the rider R that rotates the rear wheel 12, as illustrated in FIGS. 1 to 4.

In addition, the rear wheel support portion 110 according to the present disclosure may be configured by two rear wheel support portions 110, that is, a first rear roller 112 and a second rear roller 11 which rotate back and forth from the bottom of the rear wheel 12 for stable support of the rear wheel 12.

If the front wheel 14 is supported by the front wheel support portion 130 to be described below In a state where the rear wheel 12 is stably supported by the first and second rear rollers 112 and 114 arranged as above, the rider R riding on the bicycle 10 may naturally pedal without being restrained in particular.

The road surface implementation portion 120 is a technical characteristics portion only of the present disclosure provided for the rider R that pedals various types of impact characteristics transmitted to the rear wheel 12 (and the front wheel 14) according to states of roads such as a general paved road, an unpaved road, and a mountain road, and this allows the rider R to experience dynamic and realistic riding.

The road surface implementation portion 120 described above may be implemented by a plurality of uneven portions 124 configured to perform a protrusion operation at various heights on an outer circumferential surface of the rear wheel support portion 110 in contact with the rear wheel 12, and a variable protrusion operation, that is, a reciprocating motion of the uneven portions 124 may be performed by an electrical (solenoid or the like) or mechanical drive method.

As illustrated in FIGS. 3A to 3C, the road surface implementation portion 120 according to the first embodiment of the present disclosure may be implemented in a mechanical method using a pressure of fluid F, and this is to accurately and quickly control the protrusion operation of the uneven portion 124 even in a state where loads of the rider R and the bicycle 10 are applied, and to simplify the number of components and a structure.

As an example, the road surface implementation portion 120 may be configured to include an outer frame 122, the uneven portion 124, a drive unit 126, and so on, as illustrated in FIGS. 3A and 3B.

The outer frame 122 is a cylindrical configuration element that forms an outer edge of the road surface implementation portion 120, and in a case where the uneven portion 124 to be described below does not protrude outward (see FIG. 5A), the outer frame 122 may provide the rider R with feeling of a flat road surface, such as a concrete paved road, an asphalt paved road, and a track of a velodrome by directly contacting the rear wheel 12.

A plurality of surface holes 122a are formed on a surface of the outer frame 122 such that protrusions 124a of the uneven portions 124 to be described below protrude to the outside, and sizes, the number, and arrangement thereof are formed to correspond to the uneven portions 124.

The uneven portion 124 is a configuration element that reciprocates inside the outer frame 122 to provide (see FIG. 5B) the rider R with feeling of a uneven road surface such as an unpaved forest road or a mountain road formed of coarse sand or pebble, the protrusions 124a that perform the protrusion operation at various heights through the surface holes 122a are provided at one end portion, and a piston that variably receives a pressure of the fluid F from the drive unit 126 to be described below is provided at the other end portion.

A plurality of the uneven portions 124, each having a structure described above, are provided over the entire outer circumferential surface of the road surface implementation portion 120 and may be arranged to be spaced apart from each other regularly or irregularly as necessary. At this time, the number of uneven portions 124 and a size of the protrusion 124a may be formed differently from each other as illustrated in FIGS. 3A and 4A, in a case where the rear wheel support portion 110 is configured by the first rear roller 112 and the second rear roller 114.

That is, while the number of uneven portions 124 provided in the first rear roller 112 may be reduced and sizes of the protrusions 124a may be increased relatively such that pebble-like feeling may be transmitted to the rider, while reducing the number of uneven portions 124 relatively so that a feeling similar to pebble may be transmitted to the rider R, the number of uneven portions 124 provided in the second rear roller 114 may be increased and the sizes of the protrusions 124a may be reduced relatively such that coarse sand-like feeling may be transmitted to the rider.

Through the first rear roller 112 and second rear roller 114 having different uneven portions 124, the rider R may experience not only feeling of the road surface formed by pebble (a case where only the uneven portion 124 of the first rear roller 112 protrudes) or coarse sand (a case where only the uneven portion 124 of the second rear roller 114 protrudes) but also feeling of the road surface where the pebble and the coarse sand are mixed (a case where all the uneven portions 124 of the first rear roller 112 and second rear roller 114 protrude).

Of course, unlike the illustration, the road surface implementation portion 120 having the uneven portion 124 of the same shape may be provided in the first rear roller 112 and second rear roller 114, respectively.

The drive unit 126 is a configuration element for reciprocating the uneven portion 124 by variably providing a pressure of the fluid F to another end portion 124b of the uneven portion, and may configured to include a hollow-shaped shaft 126a, a branch cylinder 126b, a pump 126c, and so on, according to an example of the first embodiment illustrated in FIG. 3B.

Here, the fluid F is a concept encompassing an indefinite gas or liquid that may flow, and the fluid F that may be applied to the present disclosure may be air, oil or the like which easily to transmits and controls a pressure and may be used as the same meaning hereinafter unless otherwise described.

While the shaft 126a forms a rotation axis of the rear wheel support portion 110, the shaft 126a is a configuration element of a pipe-shape in which the hollow 126a1 through which the fluid F flows is formed, and both ends thereof are axially coupled with the base frame 102 such that free rotation for the base frame 102 is performed.

The branch cylinder 126b is a configuration element that enables the other end portion (piston) 124b of the uneven portion and the shaft 126a to communicate with each other, such that a pressure caused by the fluid F is transmitted to the other end portion 124b of the uneven portion, maintains a sealed state with the other end portion 124b of the uneven portion, and guides reciprocating motion of the uneven portion 124.

Unlike the illustration of FIG. 3B, it is natural that the branch cylinder 126b may be manufactured in the form of a manifold having a plurality of outlets that communicate with one inlet communicating with the shaft 126a and the other end portion 124b of the uneven portion or may be implemented as a flexible hydraulic hose for communicating between the shaft 126a and the other end portion 124b of the uneven portion.

In addition, a plurality of branch cylinders 126b are respectively provided with flow control valves (not illustrated) for varying a flow rate of the fluid, and individually controlled through a control unit 140 to be described below, and thereby, the plurality of uneven portions 124 may protrude differently from each other.

The pump 126c is a configuration element provided on at least one of both end portions of the shaft 126a to variably provide the fluid F to the shaft 126a through a rotary joint 126d, and may be implemented as a commercially available small hydraulic pump or pneumatic pump having a use pressure capable of supporting the total weight (approximately 120 kg) of the bicycle 10 and the rider R.

As the pressure inside the hollow 126a1 and the branch cylinder 126b is increased and decreased by the pump 126c which controls the amount of the fluid F provided to the shaft 126a (hollow 126a1), a degree of protrusion of the uneven portion 124 may be freely varied (see FIGS. 5A and 5B).

The rotary joint 126d is a configuration element configured by a pair of tubular members that relatively rotate while making the fluid F flow (pressure transmit) in a sealed state, and the tubular member on one side communicate with the pump 126c and the tubular member on the other side communicate with the shaft 126a. Through the rotary joint 126d, the shaft 126a may be stably provided with the fluid F from the pump 126c and may rotate together according to rotation of the rear wheel 12 at the same time.

At least one elastic body 125 that elastically supports the uneven portion 124 inward with respect to the outer frame 122 may be provided between the outer frame 122 and the uneven portion 124, which is to prevent the protrusions 124a of the uneven portion 124 from protruding from the outer frame 122 in a case where the pump 126c stops an operation so as not to provide the fluid F into the shaft 126a (hollow 126a1).

Meanwhile, as illustrated in FIG. 3C, the road surface implementation portion 120 according to the first embodiment of the present disclosure may be configured to include the outer frame 122, the uneven portion 124, a drive unit 126, and so on as another example.

At this time, unlike the case of one example, the uneven portion 124 has a plurality of protrusions 124a integrally formed at one end portion and has at least one piston at the other end portion 124b.

The drive unit 126 is configured by a hydraulic cylinder 126e connected to the other end portion 124b of the uneven portion to reciprocate the uneven portion 124, and the pump 126c that variably provides the hydraulic cylinder 126e with the fluid F through a hydraulic line 126f to drive the hydraulic cylinder 126e.

Here, it is preferable for the hydraulic cylinder 126e to use a single-acting product provided therein with a spring for returning a piston rod to simplify the hydraulic line 126f, and to use a thin product whose piston rod length is relatively short to be easily mounted even in a narrow space.

Furthermore, as illustrated in FIGS. 4A and 4B, the road surface implementation portion 120 according to the second embodiment of the present disclosure may include the outer frame 122, an inner frame 123, the uneven portion 124, the drive unit 126, and so on to implement not only various road surfaces according to the first embodiment but also a road surface such as Cobblestone as an example.

Here, the outer frame 122 is a cylindrical configuration element which is configured by two or more split frames (but, four split frames 122-1 to 122-4 in FIGS. 4A to 4C) that perform an outward protrusion operation and which forms an outer edge of the road surface implementation portion 120.

According to the outer frame 122 which performs the protrusion operation in this way, in a case where the uneven portion 124 and the outer frame 122 itself do not protrude outwardly (see FIG. 5A), the outer frame comes into direct contact with the rear wheel 12, and thus, feeling of a flat road surface such as a concrete paved road, an asphalt paved road, and a velodrome track may be provided to the rider R, and in a case where the outer frame 122 protrudes (see FIG. 5C), Cobblestone-like feeling may be provided to the rider R.

At this time, the Cobblestone refers to an old paved road in the Roubaix region of France, which is made by tightly paved stones of an uneven brick shape, and corresponds to a partial course of a bicycle competition (Paris-Roubaix) with a long tradition.

Such Cobblestone may be implemented indirectly through a difference or gap between the split frames 122-1 to 122-4 generated when the two or more split frames 122-1 to 122-4 perform an outward protrusion operation as needed.

The plurality of surface holes 122a are formed on a surface of the outer frame 122 such that the protrusions 124a of the uneven portions 124 may protrude outwardly, and a size, the number, and an arrangement thereof are all formed to correspond to the uneven portion 124.

The inner frame 123 is a configuration element which is provided to be in close contact with an inner surface of the outer frame 122 described above and in which the plurality of through-holes 123a corresponding to the surface holes 122a of the outer frame 122 are formed.

The uneven portion 124 is a configuration element which reciprocates inside the inner frame 123 to provide the rider R with feeling of an uneven road surface such as an unpaved forest road or a mountain road formed of coarse sand or pebble, includes the protrusions 124a performing the protrusion operation at various heights through the surface holes 122a and the through-holes 123a at one end portion, and includes a piston variably receiving the pressure of the fluid F from the drive unit 126 at the other end portion 124b.

Since the uneven portion 124 corresponds to the uneven portion 124 according to the first embodiment described above, a detailed description of a structure and the like of the uneven portion 124 will be omitted.

The drive unit 126 Is a configuration element that reciprocates at least one of the uneven portion 124 and the outer frame 122 by variably providing a pressure of the fluid F to the other end portion 124b of the uneven portion 124 and the other end portion 122b of the outer frame As illustrated in FIG. 4B, the drive unit 126 according to an example of the second embodiment of the present disclosure is configured to include the hollow-shaped shaft 126a, a first branch cylinder 126b1, a second branch cylinder 126b2, the pump 126c, and so on, and may further include a direction change valve 128.

Here, since the shaft 126a, the first branch cylinder 126b1, and the pump 126c correspond to the shaft 126a, the branch cylinder 126b, and the pump 126c according to the first embodiment described above, a detailed description thereof will be omitted.

The second branch cylinder 126b2 is a hole-shaped configuration element that enables a pressure generated by the fluid F to be transmitted to each of the other end portions 122b of the outer frame by making the other end portions 122b (pistons) of the outer frame and the shaft 126a communicate with each other, maintains a sealed state with the other end portions 122b of the outer frame, and guides reciprocation of the outer frame 122.

It is natural that at least one elastic body 125 for elastically supporting the uneven portion 124 inwardly for the inner frame 123 may be provided between the inner frame 123 and the uneven portion 124, and at least one elastic body 125 for elastically supporting the other end portion 122b of the outer frame inwardly with respect to the inner frame 123 may be provided between the inner frame 123 and the other end portion 122b of the outer frame.

In the same manner as described above, the elastic body 125 is to prevent each of the protrusion 124a of the uneven portion 124 and the outer frame 122 from protruding outwardly with respect to the inner frame 123, in a case where the pump 126c stops an operation so as not to provide the fluid F into the shaft 126a (hollow 126a1).

At this time, the elastic bodies 125 respectively provided at the other end portion 122b of the outer frame and the other end portion 124b of the uneven portion may have different elastic moduli, which is to make a protrusion operation of the outer frame 122 and a protrusion operation of the uneven portion be selectively performed differently from each other according to the pressure of the fluid F provided by the pump 126c.

That is, in a case where the elastic modulus of the elastic body 125 provided in the outer frame 122 is large, when the pressure of the fluid F provided by the pump 126c is low, only the protrusion operation of the uneven portion 124 may be performed, and when the pressure of the fluid F is high, the protrusion operation of both the uneven portion 124 and the outer frame 122 may be performed. As a result, by adjusting the pressure of the fluid F provided by the pump 126c, it is possible to selectively control the protrusion operation of the uneven portion 124 and the outer frame 122.

However, the direction change valve 128 for selectively controlling a flow of the fluid F may be installed on at least one side of the first branch cylinder 126b1 and the second branch cylinder 126b2 such that the protrusion operation of the outer frame 122 and the uneven portion 124 may be controlled more smoothly and accurately.

The direction change valve 128 applied to the present disclosure may be a commercially available valve product that selectively allows the flow of the fluid F toward either the first branch cylinder 126b1 or the second branch cylinder 126b2 or allows the flow of the fluid F toward both the first branch cylinder 126b1 and the second branch cylinder 126b2 according to a magnitude of the pressure (mechanical division change valve 128) of the fluid F provided by the pump 126c or an electrical control (electronic division change valve 128: solenoid valve) of the control unit 140 to be described below.

Meanwhile, as illustrated in FIG. 4C, the road surface implementation portion 120 according to the second embodiment of the present disclosure may be configured to include the outer frame 122, the inner frame 123, the uneven portion 124, the drive unit 126, and so on as another example.

At this time, unlike the case of one example, the uneven portion 124 has one end portion integrally formed with the plurality of protrusions 124a and the other end portion 124b including at least one piston.

The drive unit 126 is configured to include the hydraulic cylinders 126e respectively connected to the other end portion 122b of the outer frame and the other end portion 124b of the uneven portion to reciprocate the uneven portion 124, and the pump 126c which drives the hydraulic cylinder 126e by variably supplying the fluid F to the hydraulic cylinder 126e via the hydraulic line 126f.

Here, it is preferable for the hydraulic cylinder 126e to use a single-acting product provided therein with a spring for returning a piston rod to simplify the hydraulic line 126f, and to use a thin product whose piston rod length is relatively short to be easily mounted even in a narrow space.

As illustrated in FIGS. 1, 2, and 6, the bicycle simulator 100 according to the present disclosure may further include the front wheel support portion 130, a power transmission unit 132, a brake device 135, the control unit 140, a bicycle fixing portion 150, a speed measurement unit 160, a display device 170, a power storage device 180, an actuator 190, and so on to provide a more realistic and interesting virtual riding environment to the rider R.

Here, the front wheel support portion 130 is a rod-shaped configuration element that supports the front wheel 14 of the bicycle 10 mounted on the bicycle simulator 100 and rotates together with rotation of the rear wheel support portion 110, and both end portions are axially coupled to a base frame 102 of the bicycle simulator 100 to freely rotate forward or backward about the based bicycle 10.

As illustrated in FIGS. 1 and 2, the front wheel support portion 130 is manufactured to have a circular longitudinal cross section for a smooth rotation of the front wheel 14 without providing a heterogeneous drive feeling to the rider R, and since there is provided a structure in which the rear wheel 12 is stably supported by the first rear roller 112 and the second rear roller 114, the front wheel support portion 130 may be configured as one piece.

At this time, the front wheel support portion 130 may be provided with a road surface implementation portion 120 including a plurality of uneven portions 124 which are in contact with the front wheel 14 and perform a protrusion operation at various heights like the rear wheel support portion 110. This makes it possible to realistically experience various states of a road surface not only in the rear wheel 12 but also in the front wheel 14.

The road surface implementation portion 120 provided in the front wheel support portion 130 is described in detail above, and thus, a detailed description thereof will be omitted.

The power transmission unit 132 is a configuration element that transmits a rotational force of the rear wheel support portion 110 to the front wheel support portion 130 to rotate the front wheel 14, and may be implemented as a chain or a timing belt provided in an annular shape extends over one side of each of the rear wheel support portion 110 and the front wheel support portion 130.

The brake device 135 is a configuration element for promoting safety of the rider R by stopping rotation of the rear wheel support portion 110 in a case where an emergency occurs during riding of the bicycle, and may be configured by a brake foot plate 135a provided on both sides of pedals of the mounted bicycle 10 and a caliper 135b that is connected to the brake foot plate 135a to suppress rotation of the rear wheel support portion 110 (or the shaft 126a) when the brake foot plate 135a is pressed.

The control unit 140 is a configuration element that is electrically connected to the pump 126c of the road surface implementation portion 120, the direction change valve 128 (solenoid valve), which are described above, the speed measurement unit 160, the blowing device 162, the display device 170, the power storage device 180, the actuator 190, and so on, which will be described below, to receive data to control an operation of each device based on the received data.

The control unit 140 is implemented as a modular unit such as a micro controller unit (MCU), a microcomputer, an Arduino, or the like, and a memory 142 may be provided therein.

The memory 142 may be implemented by a hard disk drive (HDD), a read only memory (ROM), a random access memory (RAM), a flash memory 142, a memory 142 card, or the like, and may store an operating system program for operating the bicycle simulator 100 according to the present disclosure, data necessary for this, and the like.

At this time, necessary data may include image information (including road surface state information) which is generated with data of courses of various bicycle competitions or a drive environment for a specific region through 3D mapping technology, drive information for each rider R, or so on.

A series of processes of the control unit 140 that controls each connected device and processes or stores the received data and the like is performed by being coded into a programming language such as a machine language. Specific implementation and a control method of the control unit 140 may be easily performed in various ways and forms at a level of those skilled in the art, and thus, description thereof will be omitted.

The bicycle fixing portion 150 is a configuration element that is detachably coupled to one side of the bicycle 10 to stably fix a position of the bicycle 10 and slides left and right to guide left and right movements of the bicycle 10 and may be configured to include a clamp 152, a coil spring 154, a guide body 156, a sliding rail 158, and so on.

The clamp 152 is a configuration element that is detachably coupled to one side (down tube) of the bicycle frame 11, and the coil spring 154 is a configuration element that is coupled to a lower end portion of the clamp 152 to prevent left and right fall of the bicycle 10 and to cushion impact.

And the guide body 156 is a configuration element that is coupled to a lower end portion of the coil spring 154 and has a guide groove formed in a lower surface, and the sliding rail 158 is a configuration element whose upper end portion is fitted to the guide groove in a state fixed to the base frame 102 to guide left and right movements of the guide body 156 in a predetermined range and prevents detachment.

Through the bicycle fixing portion 150 described above, the rider R may fix various commercially available bicycles 10 to the bicycle simulator 100 according to the present disclosure to use. In addition, stable riding may be continued without risk of falling, and the natural left and right movements of the bicycle 10 according to pedaling may be made, and thus, more natural riding may be implemented.

The speed measurement unit 160 is a configuration element that calculates a travel speed from rotation (magnitude of a circumference of the rear wheel 12 and rotation speed of the rear wheel 12 per unit time) of the rear wheel 12, and may be installed in a position adjacent to the rear wheel 12 to accurately count the rotation speed of the rear wheel 12.

The blowing device 162 is a configuration element for providing a variable wind to the rider R according to the travel speed calculated by the speed measurement unit 160, and a pair of the blowing device 162 may be provided in a state of facing the rider R on upper left and right sides of the display device 170 to be described below.

The travel speed calculated in real time from the speed measurement unit 160 described above may be transmitted to the control unit 140 as drive information on a course of a bicycle competition or a specific region selected by the rider R and stored on the memory 142.

In addition, the control unit 140 that receives the travel speed operates and controls the blowing device 162 at a strength corresponding to the related speed, thereby, providing a dynamic and realistic riding experience to the rider R.

The display device 170 is a configuration element that visually transmits a drive environment and the like for a course of a bicycle competition or an operating system program to the rider R and may be the curve-shaped display device 170 sized to cover an entire viewing angle of the rider R or a goggle-shaped display device 170' worn by the rider R as described in FIG. 1.

While the display device 170 realistically displays a predetermined drive environment and the like from the image information stored in the memory 142 through the control of the control unit 140, the control unit 140 variously controls an operation of the uneven portion 124 based on the road surface state information corresponds to the drive environment provided in real time.

As described above, due to the uneven portion 124 operating in conjunction with the display device 170, the rider R riding on the bicycle 10 may experience states of various road surfaces such as a paved road (velodrome), a mountain road, and Cobblestone illustrated in FIGS. 5A to 5C not only visually but also throughout the whole body, thereby, being able to enjoy more dynamic and exciting riding in an indoor space.

The power storage device 180 is a configuration element that converts kinetic energy of the rear wheel 12 generated by pedaling of the rider R into electrical energy and stores the electrical energy, and may be provided on at least one of both end portions of the rear wheel support portion 110 to generate electricity in conjunction with rotation of the rear wheel support portion 110 and store the electricity.

However, in a case where the rear wheel support portion 110 is configured by a pair of first and second rear rollers 112 and 114, it is preferable that the power storage device 180 is provided at both end portions of the second rear roller 114 not having a power transmission load to the front wheel support portion 130.

The electrical energy stored in the power storage device 180 may be used to drive the drive unit 126 (pump 126c), the speed measurement unit 160, the blowing device 162, the display device 170, the actuator 190, and so on under the control of the control unit 140. As described above, a technique of converting rotational energy into electrical energy and storing the electrical energy is already well known, and thus, a detailed description thereof will be omitted.

The actuator 190 is a configuration element that performs expansion and contraction operations along a longitudinal direction such that the bicycle simulator 100 itself according to the present disclosure forms a slope back and forth and left and right with respect to the ground, and four actuators may be provided symmetrically in a lower corner of the base frame 102. A technology of the actuator 190 that performs the expansion and contraction operations as described above is also an already well known technology, and thus, a detailed description thereof will be omitted.

The actuator 190 may be operated and controlled by the control unit 140 according to a slope of the drive environment provided in real time through the display device 170 to tilt the bicycle 10 in all directions.

While specific embodiments of the present disclosure are described and illustrated above, it is to be understood that the present disclosure is not limited to the described embodiments and that various modifications and changes may be made without departing from the spirit and scope of the present disclosure. Therefore, such modification examples or change examples should not be understood individually from the technical spirit or point of view of the present disclosure, the modified embodiments will belong to the claims of the present disclosure.

INDUSTRIAL APPLICABILITY

A virtual road surface implementation-type bicycle simulator according to the present disclosure is a disclosure with industrial applicability because a rider on a bicycle is virtually provided with states of various road surfaces such as a general paved road, an unpaved road, and a mountain road, thereby, enabling dynamic and realistic riding, and a modular road surface implementation portion simplifies a structure of the bicycle simulator itself, resulting in easy manufacture and maintenance, and the present disclosure overcomes limitations of an existing technology in that safety of the rider may be ensured by a natural change of the road surface without any special impact, and thus, not only use of the related technology but also commercial availability or possibility of business of a device to be applied is sufficient, and the device may be implemented realistically and clearly.

The invention claimed is:

1. A virtual road surface implementation-type bicycle simulator comprising:
a rear wheel support portion that supports a rear wheel of a mounted bicycle and rotates together with rotation of the rear wheel; and
a road surface implementation portion including a plurality of uneven portions that perform a reciprocating motion at various heights on an outer peripheral surface of the rear wheel support portion such that a feeling of an uneven road surface is provided to a rider riding the mounted bicycle;
wherein the road surface implementation portion further comprises:
an outer frame which forms an outer edge and includes a plurality of surface holes formed therein, wherein the plurality of uneven portions reciprocate inside the outer frame such that protrusions provided at a first end thereof perform the reciprocating motion through the surface holes; and
a drive unit that variably provide pressure of fluid to a second end of the plurality of uneven portions to reciprocate the protrusions at the first end.

2. The virtual road surface implementation-type bicycle simulator of claim 1, wherein the rear wheel support portion comprises:
a first rear roller and a second rear roller which supportably rotate back and forth at a lower side of the rear wheel, and
wherein each of the first rear roller and the second rear roller is provided with the road surface implementation portion including the plurality of uneven portions, and the plurality of uneven portions have the same shape or different sizes with respect to each other.

3. The virtual road surface implementation-type bicycle simulator of claim 2, further comprising a front wheel support portion that supports a front wheel of the mounted bicycle and rotates together with rotation of the rear wheel support portion.

4. The virtual road surface implementation-type bicycle simulator of claim 3, further comprising a power transmission unit that transmits a rotational force of the rear wheel support portion to the front wheel support portion to rotate the front wheel.

5. The virtual road surface implementation-type bicycle simulator of claim 1, wherein the drive unit further comprises:
a hollow-shaped shaft forming a rotation axis of the rear wheel support portion,
a branch cylinder respectively communicating between the first end and the second end of the uneven portions and the shaft, and
a pump for variably providing the fluid to the shaft through a rotary joint.

6. The virtual road surface implementation-type bicycle simulator of claim 1, further comprising a bicycle fixing portion that is detachably coupled to one side of the bicycle to fix a position of the bicycle, slides left and right, and guides left and right movements of the bicycle.

7. The virtual road surface implementation-type bicycle simulator of claim 1, further comprising:
a speed measurement unit that calculates a travel speed from rotation of the rear wheel, and
a blowing device that provides a variable wind to the rider according to the travel speed calculated by the speed measurement unit.

8. The virtual road surface implementation-type bicycle simulator of claim 1, further comprising:
a display device that visually provides the rider with a predetermined travel environment, and
a control unit that controls the reciprocating motion of the plurality of uneven portions according to the travel environment provided in real time with the display device.

9. The virtual road surface implementation-type bicycle simulator of claim 8, further comprising:
a power storage device that generates electricity in conjunction with rotation of the rear wheel support portion and stores the electricity, and
a plurality of actuators that tilts the bicycle in all directions according to a slope of the travel environment provided in real time with the display device.

10. A virtual road surface implementation-type bicycle simulator comprising:
a rear wheel support portion that supports a rear wheel of a mounted bicycle and rotates together with rotation of the rear wheel; and
a road surface implementation portion including a plurality of uneven portions that perform a reciprocating motion at various heights on an outer peripheral surface of the rear wheel support portion such that a feeling of an uneven road surface is provided to a rider riding the mounted bicycle;
wherein the road surface implementation portion further comprises:
an outer frame forming an outer edge, having a plurality of surface holes formed therein, and including two or more split frames which protrude;
an inner frame which includes a plurality of through-holes corresponding to the surface holes formed therein, wherein the plurality of uneven portions reciprocate inside the inner frame such that protrusions provided at a first end thereof perform the reciprocating motion through the surface holes and the through-holes; and
a drive unit that reciprocates at least one of the uneven portions and the outer frame by variably providing pressure of fluid to the at least one of the uneven portions at a second end and another end portion of the outer frame.

11. The virtual road surface implementation-type bicycle simulator of claim 10, wherein the drive unit further comprises:
a hollow-shaped shaft forming a rotation axis of the rear wheel support portion,
a first branch cylinder that respectively communicates between the at least one of the uneven portions at the second end and the shaft,
a second branch cylinder that communicates between said another end portion of the outer frame and the shaft,
a pump that variably provides the fluid to the shaft through a rotary joint, and a direction control valve that is provided at at least one of the first branch cylinder and the second branch cylinder to selectively control flow of the fluid.

\* \* \* \* \*